United States Patent [19]

Tanaka et al.

[11] Patent Number: 5,045,706
[45] Date of Patent: Sep. 3, 1991

[54] FLUORESCENT SCREEN

[75] Inventors: Satoru Tanaka; Yasushi Murata, both of Saitama, Japan

[73] Assignee: Pioneer Electronic Corporation, Tokyo, Japan

[21] Appl. No.: 505,164

[22] Filed: Apr. 5, 1990

[30] Foreign Application Priority Data

Oct. 30, 1989 [JP] Japan .................................. 1-282156

[51] Int. Cl.⁵ ............................................... G01T 1/20
[52] U.S. Cl. .............................. 250/483.1; 250/484.1; 250/486.1
[58] Field of Search ...................... 250/483.1, 484.1 B, 250/486.1, 487.1, 488.1

[56] References Cited

U.S. PATENT DOCUMENTS

| 2,716,081 | 8/1955 | Marks et al. | 250/483.1 |
| 2,716,082 | 8/1955 | Smith et al. | 250/483.1 |
| 2,802,753 | 8/1957 | Crosby et al. | 250/488.1 |
| 2,851,612 | 9/1958 | Davey | 250/483.1 |
| 3,291,668 | 12/1966 | Goldstein | 250/483.1 |
| 4,032,791 | 6/1977 | Chiola et al. | 250/483.1 |
| 4,916,321 | 4/1990 | Shiraishi | 250/484.1 B |

Primary Examiner—Jack I. Berman
Assistant Examiner—Kiet T. Nguyen
Attorney, Agent, or Firm—Foley & Lardner

[57] ABSTRACT

A fluorescent screen comprises a plate woven or knitted from one or more threads each including an organic fluorescent substance. Since the luminescent light is scattered by the threads constructing the plate, the light emitted from the screen is increased to a level higher than that of the conventional fluorescent screen to enhance brightness thereof.

20 Claims, 2 Drawing Sheets stimulating light

FLUORESCENT SCREEN

BACKGROUND OF THE INVENTION

1. Field of the Invention

The present invention relates to a fluorescent screen, and more particularly to a fluorescent screen containing an organic substance capable of emitting visible light when activated by stimulating light impinging thereto.

2. Description of the Prior Art

There is known a display system having a fluorescent screen which comprises a flat plate made of a transparent plastic containing a fluorescent substance which generates fluorescense (or phosphorescence) when activated by stimulating light impinging thereto such as ultraviolet light, visible light, near-infrared radiation, or the like. The fluorescent substance is for example a piperidinium tetra benzoyltrifluoroacetone europium complex as disclosed in Japanese patent application Laid Open No. 63-191884. When a scanning beam of stimulating light is impinged onto the fluorescent screen in such a manner that it forms a minute spot on the screen, the fluorescent substance existing within the spot emits light. The spot plays the role of a picture element a plurality of which display an image.

Such a known fluorescent screen is utilized for a display segment used in an image display device of a rear-projection or front-projection type. In the rear-projection type, the scanning beam of stimulating light is applied onto the back side of the fluorescent screen immediately after luminescent light is allowed to pass through the front side thereof toward the observer's eyes. In the front-projection image display device, the beam of stimulating light is impinged onto the front side of the fluorescent screen immediately after luminescent light is allowed to pass through the same front side thereof toward the observer's eyes.

As shown in FIG. 1 of the accompanying drawings, when a beam of stimulating light is applied onto the back side surface 20b of a fluorescent screen 20, the luminescent light emitted from a fluorescent substance 21 is scattered in every direction as indicated by the broken lines. Since the fluorescent screen has generally been in the form of a transparent plastic plate having smooth surfaces, most of the emitted luminescent light is totally reflected between the interfacial surfaces of the fluorescent screen 20 and then laterally propagated within the fluorescent screen 20 although only one part of the emitted luminescent light goes out form the display side surface 20a of the fluorescent screen 20. Therefore, the quantity of luminescent light to be actually emitted from the fluorescent screen 20 is small in comparison with the level of the applied stimulating light, so that the conversion efficiency from the irradiated stimulating light into the emitted luminescent light is low. The intensity of luminescent light emitted toward the display side of the fluorescent screen is so low that the screen as viewed by the observer is relatively dark.

SUMMARY OF THE INVENTION

In view of the aforesaid drawbacks of the conventional fluorescent screen, it is an object of the present invention to provide a fluorescent screen which emits luminescent light of an increased intensity therefrom for a greater degree of screen brightness in response to a reference intensity of luminescent light applied to the screen.

A fluorescent screen according to the present invention comprises a plate woven or knitted from one or more threads each including an organic fluorescent substance. The threads are preferably spun yarns or filaments.

According to the present invention, the emitted luminescent light activated by the stimulating light is scattered by the neighboring fibers or threads.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
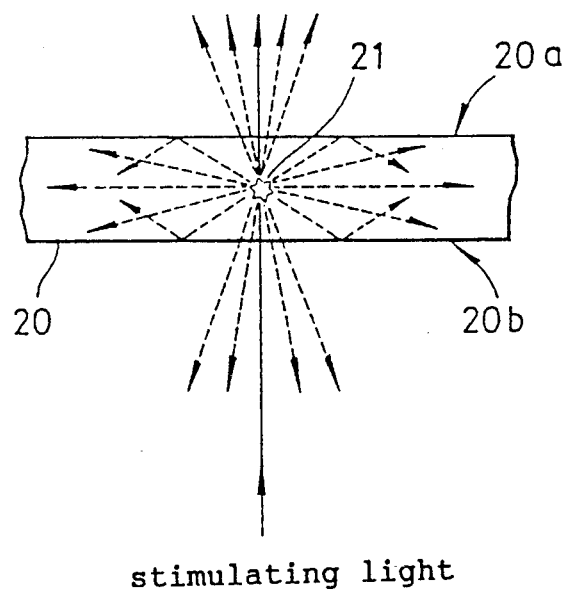
FIG. 1 is a schematic cross sectional view showing the structure of the conventional fluorescent screen.
Figure 2:
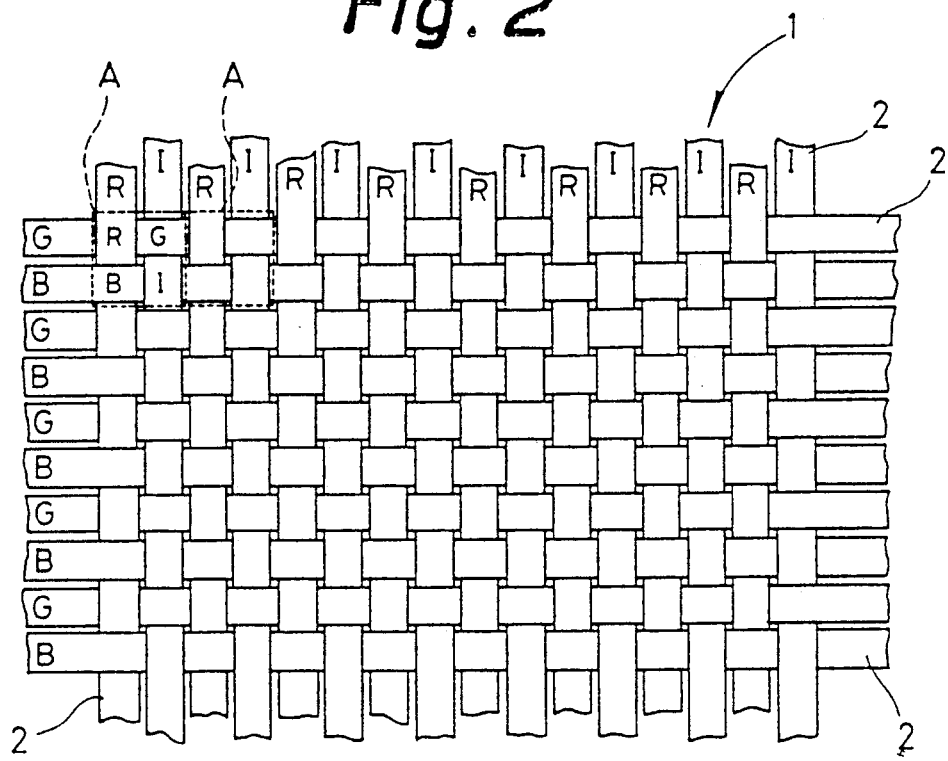
FIG. 2 is an enlarged partially front view showing the structure of an embodiment according to the present invention.

FIG. 2 shows a fluorescent screen 1 of the embodiment which comprises a plate of fabric 1 woven from threads or spun yarns 2 each including an organic fluorescent substance. The thread is obtained in such a manner that the spun yarns are immersed into a solution including a solvent and a mixture having an organic fluorescent substance and a binder, and dried to remove the solvent therefrom so that the organic fluorescent substance disperses in fibers of the spun yarns. The threads 2 are four kinds of first, second and third fluorescent threads (R), (G) and (B) which carry organic fluorescent substances respectively emit red, green and blue color lights when activated by the same stimulating light, and of a conductive index filament (I) made of cadmium sulfide CdS which generates a beam index signal when irradiated by the light beam. As shown in FIG. 2, these threads and filament (R), (G), (B) and (I) are fabricated into a plain weave fabric in such a manner that the threads (G) and (B) are alternatively placed as wefts while the threads (R) and the filament (I) are alternatively placed as warps. Therefore, each pattern element of the plain weave fabric indicated by a broken dots square A becomes a picture element in the display segment when the stimulating light beam is impinged onto the square A.

Figure 3:
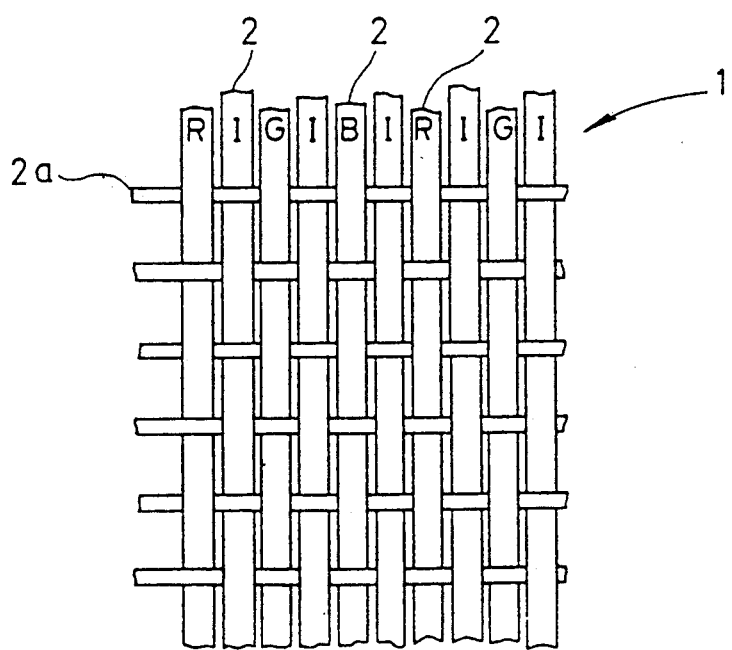
FIG. 3 is an enlarged partially front view showing the structure of another embodiment according to the present invention.

FIG. 3 shows a fluorescent screen 1 of another embodiment which comprises a plain weave fabric woven from the threads or spun yarns in such a manner that the threads (R), (G) and (B) are repeatedly placed in regular sequence while the conductive index filament (I) is interposed therebetween as warps, respectively, and another filament or yarn 2a is used for a weft.

The first fluorescent thread (R) is manufactured thorough the following steps.

First of all, a fluorescent substance of piperidinium tetra benzoyltrifluoroacetone europium complex and a binder including monomers or oligomers for polymethylmethacrylate (PMMA) are added to a solvent of dichloroethane. This fluorescent substance emits red light when it is activated by irradiated ultraviolet light but not by visible light. The binder is used to prevent the peeling of particles of the fluorescent substance. The solution including the organic fluorescent substance and the binder is then uniformly stirred to obtain a mixture of the fluorescent substance and the binder.

A cheese or corn of spun yarn is dipped in the solution. The solution enters and disperses between fibers constructing the spun yarn.

The cheese carrying the solution is left alone to dry at a predetermined temperature during a predetermined time period to remove the solvent therefrom. In this time period, the binder is solidified by polymerization. The organic fluorescent substance is fixed to the fibers of the spun yarn by means of the solidified binder. In this way, the first fluorescent thread (R) is manufactured. The second and third fluorescent threads (G) and (B) are also prepared in the same way as the first fluorescent thread (R) while using a pertinent fluorescent substances, respectively. The spun yarns and threads (R), (G) and (B) and the conductive index filaments (I) are woven into a plain weave by means of a weaving machine.

A fluorescent screen may be formed of a plate woven from filaments each capable of including an organic fluorescent substance instead of spun yarns. In this case, the filament is prepared in the following steps. Monomers or oligomers for a synthetic resin such as polymethylmethacrylate is used as a fluid material. An organic fluorescent substance is added to the fluid. The fluid including the fluorescent substance is extruded through a die of nozzle having a minute hole to a coagulating bath and changes into an acrylic filament. The filaments and/or spun yarns may be therefore used for the threads carrying the fluorescent substances respectively.

Furthermore, a fluorescent screen may be formed of a plate knitted from one or more threads including an organic fluorescent substance instead of the weaving method.

It is needless to say that a monochrome fluorescent screen may be formed instead of a multicolored fluorescent screen fabricated of threads (R), (G) and (B) as above mentioned.

According to the present invention, the fluorescent screen comprises a plate woven or knitted from one or more threads each including an organic fluorescent substance. Since the luminescent light emitted from the fluorescent substance is scattered by the threads fabricating the screen, the light emitted from the screen is so increased that the screen brightness with respect to a reference intensity level of stimulating light is increased.

What is claimed is:

1. A fluorescent screen specially adapted for use in an image display device of rear-projection or front-projection type and having a plurality of picture elements which emit light when stimulated by a scanning beam of stimulating light impinging onto the fluorescent screen in the form of a spot, comprising a fabric plate woven or knitted from one or more threads, each of said threads including an organic fluorescent substance, said fabric plate comprising a plurality of picture elements wherein at least three intersected portions of said threads exist within each picture element.

2. A fluorescent screen as claimed in claim 1, in which said threads are spun yarns.

3. A fluorescent screen as claimed in claim 2, wherein said spun yarn comprises a plurality of fibers and a mixture of said organic fluorescent substance and a binder dispersed among said fibers.

4. A fluorescent screen as claimed in claim 3, in which said binder is polymethylmethacrylate.

5. A fluorescent screen as claimed in claim 2, wherein said fabric plate has a plain weave fabric structure.

6. A fluorescent screen as claimed in claim 5, wherein said threads comprise a first fluorescent thread carrying a first organic fluorescent substance which emits red light when activated by a stimulating light, a second fluorescent thread carrying a second organic fluorescent substance which emits green light when activated by a stimulating light and a third fluorescent thread carrying a third organic fluorescent substance which emits blue light when activated by a stimulating light, wherein said three intersected portions correspond to three primary colors portions.

7. A fluorescent screen as claimed in claim 6, wherein said threads further comprise a conductive index filament which generates a beam index signal when irradiated by a light beam.

8. A fluorescent screen as claimed in claim 1, in which said threads are filaments.

9. A fluorescent screen as claimed in claim 5, in which said synthetic resin is polymethylmethacrylate.

10. A fluorescent screen as claimed in claim 5, in which said fabric plate has a plain weave fabric structure.

11. A fluorescent screen as claimed in claim 10, in which said filaments comprise a first fluorescent filament carrying a first organic fluorescent substance which emits red light when activated by a stimulating light, a second fluorescent filament carrying a second organic fluorescent substance which emits green light when activated by a stimulating light and a third fluorescent filament carrying a third organic fluorescent substance which emits blue light when activated by a stimulating light, wherein said three intersected portions correspond to three primary colors portions.

12. A fluorescent screen as claimed in claim 11, in which said filaments further comprise a conductive index filament which generates a beam index signal when irradiated by a light beam.

13. A fluorescent screen as claimed in claim 1, in which said fabric plate has a plain weave fabric structure.

14. A fluorescent screen as claimed in claim 13, in which said filaments comprise a first fluorescent filament carrying a first organic fluorescent substance which emits red light when activated by a stimulating light, a second fluorescent filament carrying a second organic fluorescent substance which emits green light when activated by a stimulating light and a third fluorescent filament carrying a third organic fluorescent substance which emits blue light when activated by a stimulating light, wherein said three intersected portions correspond to three primary colors portions.

15. A fluorescent screen as claimed in claim 14, in which said filaments further comprise a conductive index filament which generates a beam index signal when irradiated by a light beam.

16. A fluorescent screen as claimed in claim 1, wherein said picture element has an area corresponding to the spot formed by the scanning beam of stimulating light impinging onto the fluorescent screen.

17. A method for manufacturing a fluorescent screen specially adapted for use in an image display device of a rear-projection or front-projection type and having a plurality of picture elements which emit light when stimulated by a scanning beam of stimulating light impinging onto the fluorescent screen in the form of a spot, comprising the steps of:
preparing spun yarns comprising a plurality of fibers,
preparing a solution including a solvent and a mixture which comprises an organic fluorescent substance and a binder,
immersing said spun yarns into said solution,
drying said spun yarns to remove said solvent therefrom so that said organic fluorescent substance is dispersed within the fibers of said spun yarns, and
weaving or knitting one or more of said spun yarns into a plate of fabric comprising a plurality of picture elements, wherein at least three intersected portions of said spun yarns exist within each picture element.

18. A method for manufacturing a fluorescent screen as claimed in claim 6, in which said binder is polymethylmethacrylate.

19. A method for manufacturing a fluorescent screen specially adapted for use in an image display device of a rear-projection or front-projection type and having a plurality of picture elements which emit light when stimulated by a scanning beam of stimulating light impinging onto the fluorescent screen in the form of a spot, comprising the steps of:
preparing a fluid of material for a synthetic resin including an organic fluorescent substance,
preparing spun yarns through extrusion from said fluid, and
weaving or knitting one or more of said spun yarns into a plate of fabric comprising a plurality of picture elements, wherein at least three intersected portions of said spun yarns exist within each picture element.

20. A method for manufacturing a fluorescent screen as claimed in claim 8, in which said synthetic resin is polymethylmethacrylate.

* * * * *